US008170731B2

(12) United States Patent
Martinez et al.

(10) Patent No.: US 8,170,731 B2
(45) Date of Patent: May 1, 2012

(54) SYSTEM AND METHOD FOR DETECTING REFLECTION WITH A MOBILE SENSOR PLATFORM

(75) Inventors: Steven Martinez, Albuquerque, NM (US); David Hursig, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 544 days.

(21) Appl. No.: 12/114,883

(22) Filed: May 5, 2008

(65) Prior Publication Data

US 2009/0276110 A1 Nov. 5, 2009

(51) Int. Cl.
*G05D 1/12* (2006.01)

(52) U.S. Cl. ............ 701/11; 701/519; 700/253; 700/257

(58) Field of Classification Search .................. 701/3, 4, 701/11, 200–226, 300–302; 700/253, 257, 700/264
See application file for complete search history.

(56) References Cited

U.S. PATENT DOCUMENTS

| | | | |
|---|---|---|---|
| 3,979,585 A | 9/1976 | O'Meara | |
| 4,129,775 A | 12/1978 | O'Meara | |
| 4,401,886 A * | 8/1983 | Pond et al. | 250/203.1 |
| 4,748,569 A * | 5/1988 | Gordon | 701/302 |
| 4,773,298 A | 9/1988 | Tischer et al. | |
| 4,963,024 A | 10/1990 | Ulich | |
| 5,090,797 A | 2/1992 | Cleveland | |
| 5,371,542 A | 12/1994 | Pauli | |
| 5,479,255 A | 12/1995 | Denny | |
| 5,673,050 A | 9/1997 | Moussally et al. | |
| 5,684,577 A | 11/1997 | Kash | |
| 5,686,889 A | 11/1997 | Hillis | |
| 5,764,329 A | 6/1998 | Chen | |
| 5,973,309 A | 10/1999 | Livingston | |
| 6,128,574 A | 10/2000 | Diekhans | |
| 6,208,270 B1 | 3/2001 | Dunn | |
| 6,559,447 B2 | 5/2003 | Wood | |
| 7,227,466 B2 | 6/2007 | Nelson | |
| 2005/0004723 A1 | 1/2005 | Duggan et al. | |
| 2005/0035313 A1 * | 2/2005 | Garssen et al. | 250/559.33 |
| 2005/0103943 A1 | 5/2005 | Tanielian | |
| 2005/0253927 A1 | 11/2005 | Allik | |
| 2007/0035304 A1 | 2/2007 | Stolarczyk | |
| 2007/0051848 A1 | 3/2007 | Mantych | |

(Continued)

FOREIGN PATENT DOCUMENTS

WO   WO 2005/123502   12/2005

OTHER PUBLICATIONS

MicroPilot. Horizon Ground Control Sfotware Advertisement. © 2004. Downloaded Jan. 12, 2011.*

(Continued)

*Primary Examiner* — Mark Hellner
*Assistant Examiner* — Ari M. Diacou
(74) *Attorney, Agent, or Firm* — Shumaker & Sieffert, P.A.

(57) ABSTRACT

Systems and methods for planning and executing a search route by a mobile sensor platform for detecting reflection are disclosed. The search route of the mobile sensor platform is based on the angle of a radiation source relative to the ground in a search area. While executing the search route, a sensor on the mobile sensor platform is configured to detect the reflection of radiation from an object in the search area.

20 Claims, 8 Drawing Sheets

U.S. PATENT DOCUMENTS

2007/0125951 A1 6/2007 Snider
2007/0284474 A1* 12/2007 Olson et al. .................. 244/10

OTHER PUBLICATIONS

MicroPilot. Horizon FAQ. http://www.micropilot.com/faq-horizonmp.htm Downloaded Jan. 12, 2011.*

Cremer et al., "Infrared Polarization Measurements and Modeling Applied to Surface-Laid Antipersonnel Landmines," Optical Engineering, vol. 41, No. 5, 12 pages, May 1, 2002.*

Jarurat Ousingsawat. UAV Path Planning for Maximum Coverage Surveillance of Area with Different Priorities. The 20th Conference of Mechanical Engineering Network of Thailand. Oct. 18-20, 2006.*

Goodrich et al. Supporting wilderness search and rescue using a camera-equipped mini UAV. Journal of Field Robotics 25(1), 89-110 (2008) © 2008 Wiley Periodicals, Inc. http://dx.doi.org/10.1002/rob.20226.*

Ousingsawat, J.; Earl, M.G.; , "Modified Lawn-Mower Search Pattern for Areas Comprised of Weighted Regions," American Control Conference, 2007. ACC '07 , vol., no., pp. 918-923, Jul. 9-13, 2007. doi: 10.1109/ACC.2007.4282850 URL: http://ieeexplore.ieee.org/stamp/stamp.jsp?tp=&arnumber=4282850&isnumber=4282135.*

Morris, Stephen ; Frew, Eric W. ; Jones, Henry. Cooperative Tracking of Moving Targets by Teams of Autonomous Unmanned Air Vehicles. Accession No. ADA437347. Jul. 14, 2005. http://handle.dtic.mil/100.2/ADA437347.*

J. R. Frost. Principles of Search Theory. Soza and Co. Ltd. © 1999 http://www.sarinfo.bc.ca/Library/Planning/PrincSrchThry_S.pdf.*

U.S. Dept. of Energy, National Renewable Energy Laboratory, Technical Report NREL/TP-560-34302, Solar Position Algorithm for Solar Radiation Applications (2008).

Richard D. Richmond, "Glint Responsive Parametric Amplified Phase Conjugate Signal Laser Radar," Statutory Invention Registration No. H1742, Issued Aug. 4, 1998.

European Search Report for Application No. 09158390.6, 4 pages, dated Sep. 10, 2009.

MacDonald et al., "Alternatives for Landmine Detection" "Appendix D—Infrared/Hyperspectral Methods," 16 pages, 2003.

* cited by examiner

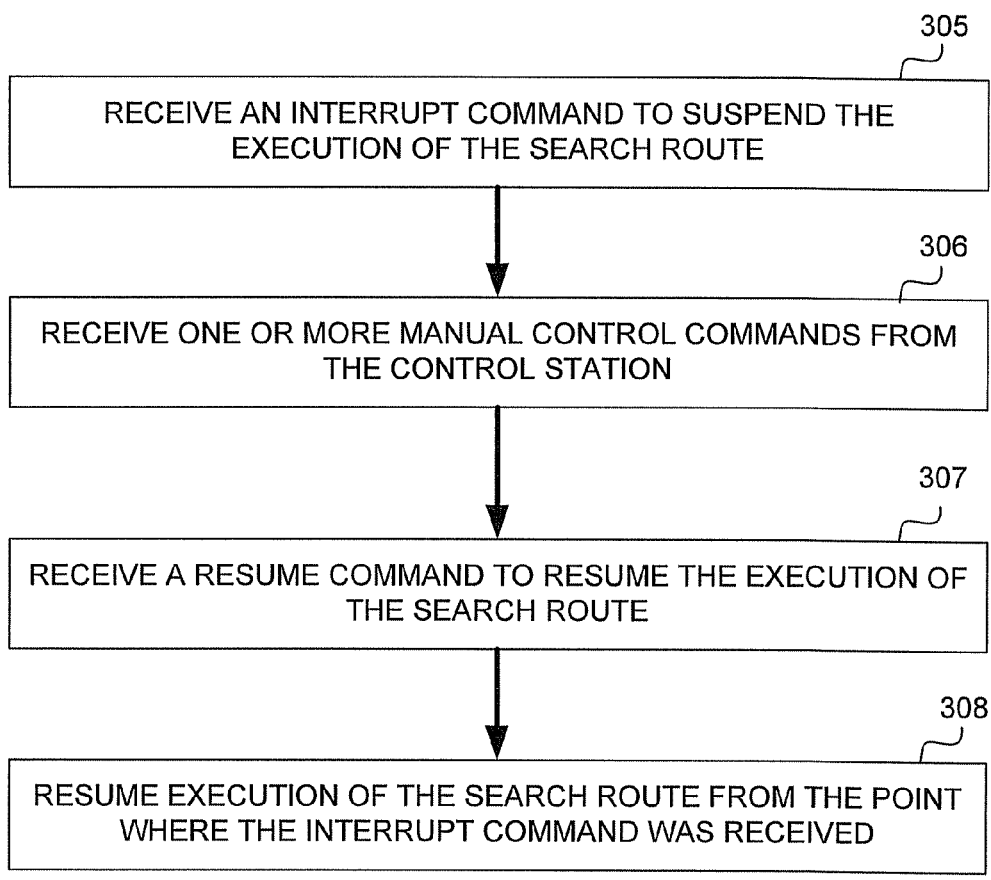

SYSTEM AND METHOD FOR DETECTING REFLECTION WITH A MOBILE SENSOR PLATFORM

FIELD

The present disclosure relates to methods and systems for planning and implementing a mobile sensor platform search route for detecting reflection.

BACKGROUND

Mobile sensor platforms include any vehicle or similar mobile platform that can deploy a sensor for scanning or otherwise monitoring a designated search area. As such, mobile sensor platforms may be used for a variety of missions such as reconnaissance, surveillance, target acquisition, ordinance identification and disposal, and the like. Examples of mobile sensor platforms may include Unmanned Air Vehicles (UAVs), Explosive Ordnance Disposal (EOD) robots, or similar manned, unmanned, autonomous, or semi-autonomous vehicles or rovers that are adapted to deploy one or more sensors.

Typically, a mobile sensor platform may execute a travel route by starting at a starting point, and then traveling along a predefined route to one or more intermediate points before arriving at an end point. An operator typically loads the starting point, the one or more intermediate points, and the end point into a mobile sensor platform control station. The travel route is then typically uploaded from the control station to the mobile sensor platform. Once the travel route is uploaded, the mobile sensor platform can execute the travel route autonomously or with varying degrees of remote guidance from the control station.

SUMMARY

Systems and methods for planning and executing a search route for detecting reflection are disclosed. The search route is based on the angle of a radiation source relative to the ground in a search area. While executing the search route, a sensor on the mobile sensor platform is configured to detect a reflection of radiation from an object in the search area.

A method according to a first illustrative embodiment includes (i) receiving an input comprising a search area, (ii) generating a mobile sensor platform search route for detecting reflection, wherein the search route is based on the angle of a radiation source relative to the ground in the search area, and (iii) displaying a graphical representation of the search route. The method of the first illustrative embodiment may further include (i) sending the search route to the mobile sensor platform, (ii) receiving data from a sensor on the mobile sensor platform, wherein the sensor is sensitive to radiation from the radiation source, and (iii) displaying a visual representation of the data received from the sensor. The method of the first illustrative embodiment may also further include (i) detecting a reflection of the radiation from an object in the search area, and (ii) generating an alert based on said detecting. The method of the first illustrative embodiment may still further include (i) sending an interrupt command to suspend the execution of the search route, (ii) sending one or more manual control commands to the mobile sensor platform, and (iii) sending a resume command to resume the execution of the search route from the point where the interrupt command was received.

A method according to a second illustrative embodiment includes (i) receiving a search route for detecting reflection, wherein the search route is received from a control station, and wherein the search route is based on the angle of a radiation source relative to the ground in a search area, (ii) autonomously executing the search route, and (iii) sending data from a sensor to the control station while executing the search route, wherein the sensor is sensitive to radiation from the radiation source. The second illustrative embodiment may further include detecting a reflection of the radiation from an object in the search area. The second illustrative embodiment may still further include (i) receiving an interrupt command to suspend the execution of the search route, (ii) receiving one or more manual control commands from the control station, (iii) receiving a resume command to resume the execution of the search route, and (iv) resuming execution of the search route from the point where the interrupt command was received.

A system according to a third illustrative embodiment includes a control station. The control station of the third illustrative embodiment includes (i) input means for receiving a search area as an input, (ii) a processor for generating at least one search route for detecting reflection, wherein the search route is based on the angle of a radiation source relative to the ground in the search area, (iii) a communication means for sending data comprising the search route to a mobile sensor platform, and for receiving a real-time video signal from a sensor mounted on the mobile sensor platform, wherein the sensor is sensitive to radiation from the radiation source, and (iv) display means for displaying a graphical representation of the search route and for displaying the real-time video signal received from the sensor mounted on the mobile sensor platform. The third illustrative embodiment may further include a mobile sensor platform. The mobile sensor platform of the third illustrative embodiment may include (i) a sensor for detecting reflection, wherein the sensor is sensitive to radiation from the radiation source, (ii) communication means for receiving data comprising the search route from the control station and for sending a real-time video signal from the sensor to the control station, and (iii) control means for autonomously executing the search route.

The subject matter regarded as the invention is particularly pointed out and distinctly claimed in the claims section. The invention however, both as to organization and method of operation, together with features and advantages thereof, may be understood by reference to the following detailed description and the drawings.

BRIEF DESCRIPTION OF THE DRAWINGS

FIGS. 2A-2D and FIGS. 3A-3C show methods according to various illustrative embodiments of the disclosed invention.

DETAILED DESCRIPTION OF THE DRAWINGS

Figure 1A:
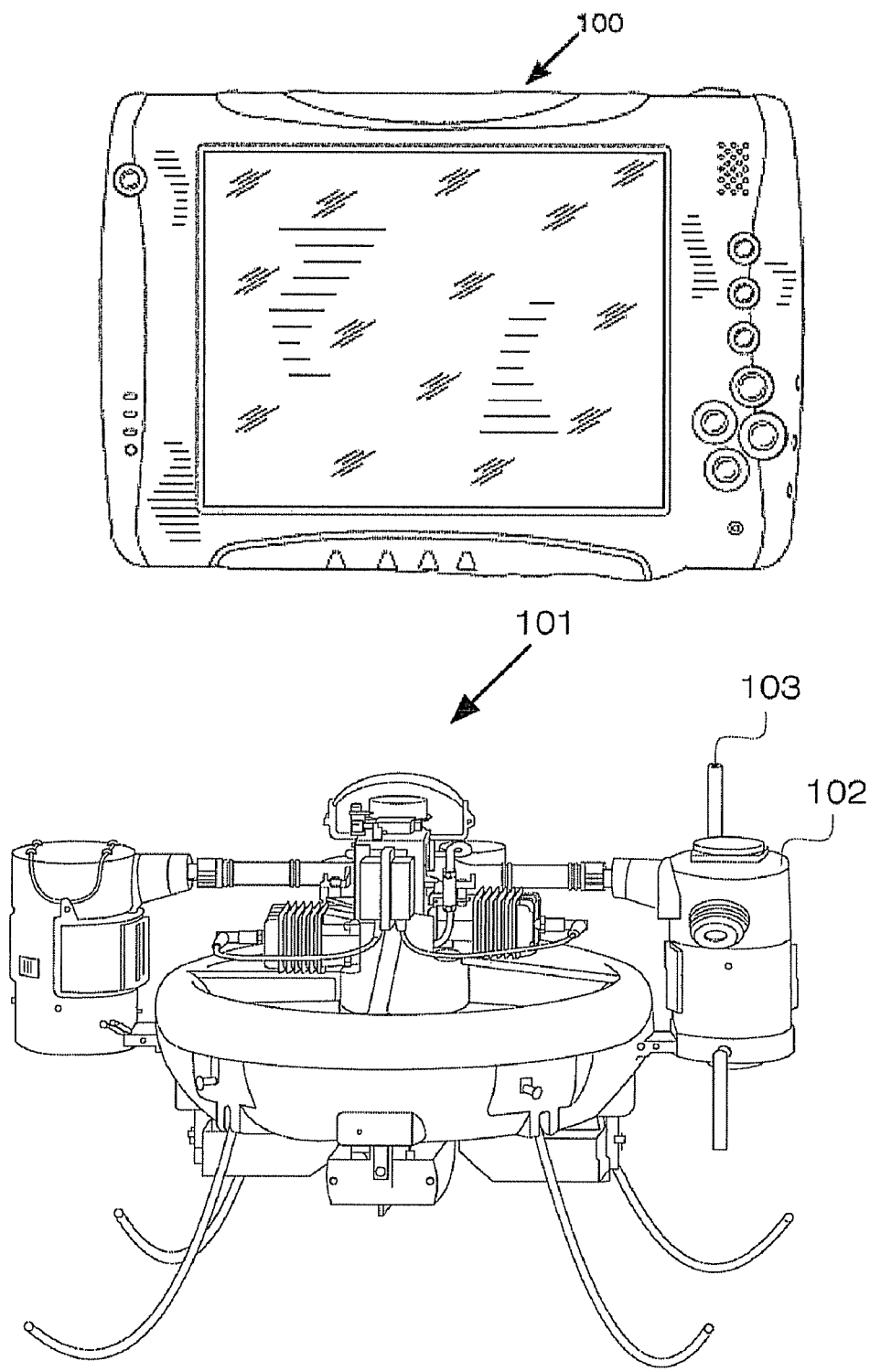
FIG. 1A shows a mobile sensor platform and a control station according to one illustrative embodiment of the disclosed invention.

In the following detailed description, numerous specific details are set forth in order to provide a thorough understanding of the invention and how it may be practiced in particular embodiments. However, it will be understood that the disclosed invention may be practiced without these specific details. In other instances, well-known methods, procedures and techniques have not been described in detail, so as not to obscure the disclosed invention. While the disclosed invention will be described with respect to particular embodiments and with reference to certain drawings, the invention is not limited hereto. The drawings included and described herein are schematic and do not limit the scope of the invention. Also, the size of some elements in the drawings may be exaggerated and, therefore, not drawn to scale for illustrative purposes.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances, and that the embodiments of the invention described herein are capable of operation in other sequences than described or illustrated herein.

Moreover, the terms top, bottom, over, under and the like in the description and the claims are used for descriptive purposes and not necessarily for describing relative positions. The terms so used are interchangeable under appropriate circumstances, and the embodiments of the invention described herein can operate in other orientations than described or illustrated herein.

Several embodiments of the invention are described below. It is clear that other embodiments of the invention can be configured according to the knowledge of persons skilled in the art without departing from the true spirit or technical teaching of the invention.

FIG. 1A shows a control station 100 and a mobile sensor platform 101 according to one illustrative embodiment of the disclosed invention. The mobile sensor platform 101 is equipped with a sensor 102 and a communications unit 103.

The control station 100 shown in Figure IA is a tablet computer, but other computing devices are envisioned, such as, for example, a laptop computer, a desktop computer, or any other general purpose computer, special purpose computer, or similar computing device with appropriate software configured to perform the functions of the control station described herein.

Figure 1B:
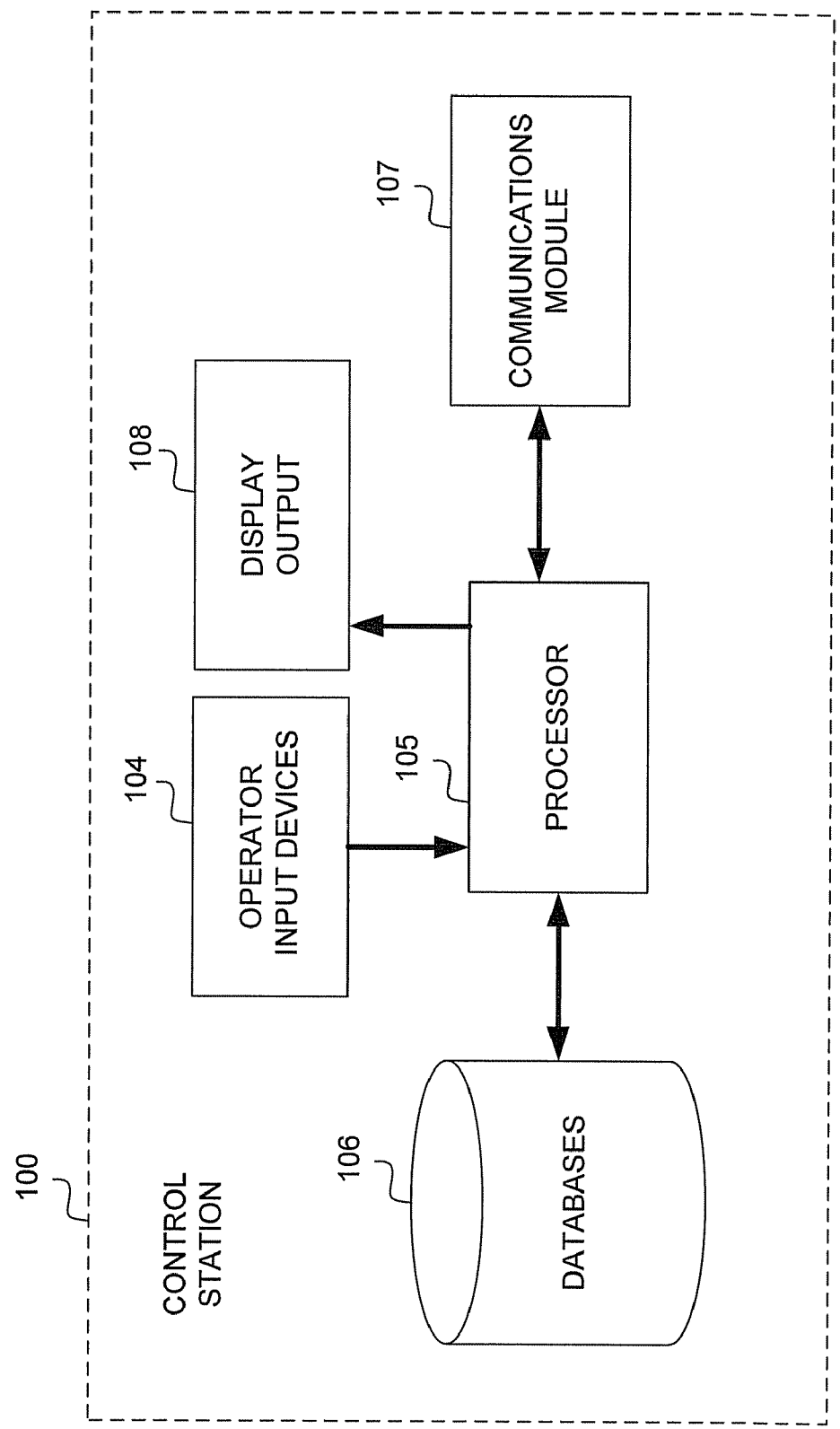
FIG. 1B shows a functional diagram of a control station according to one illustrative embodiment of the disclosed invention.
Figure 2A:
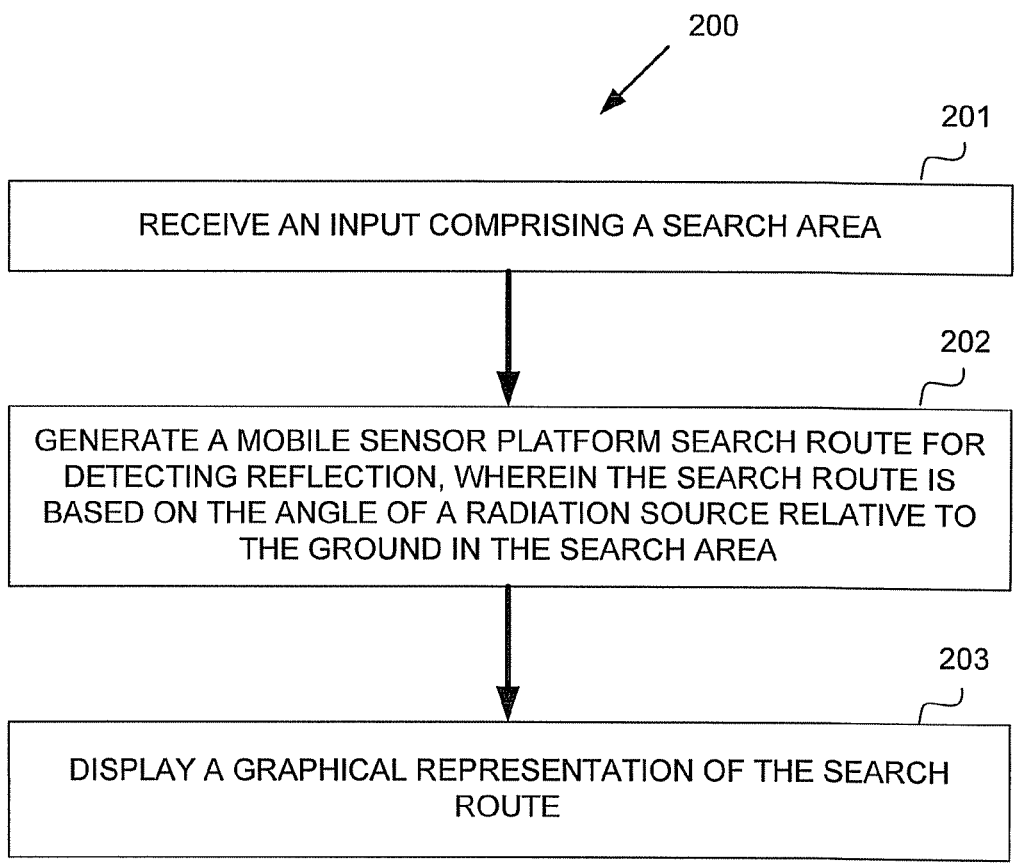
Figure 2B:
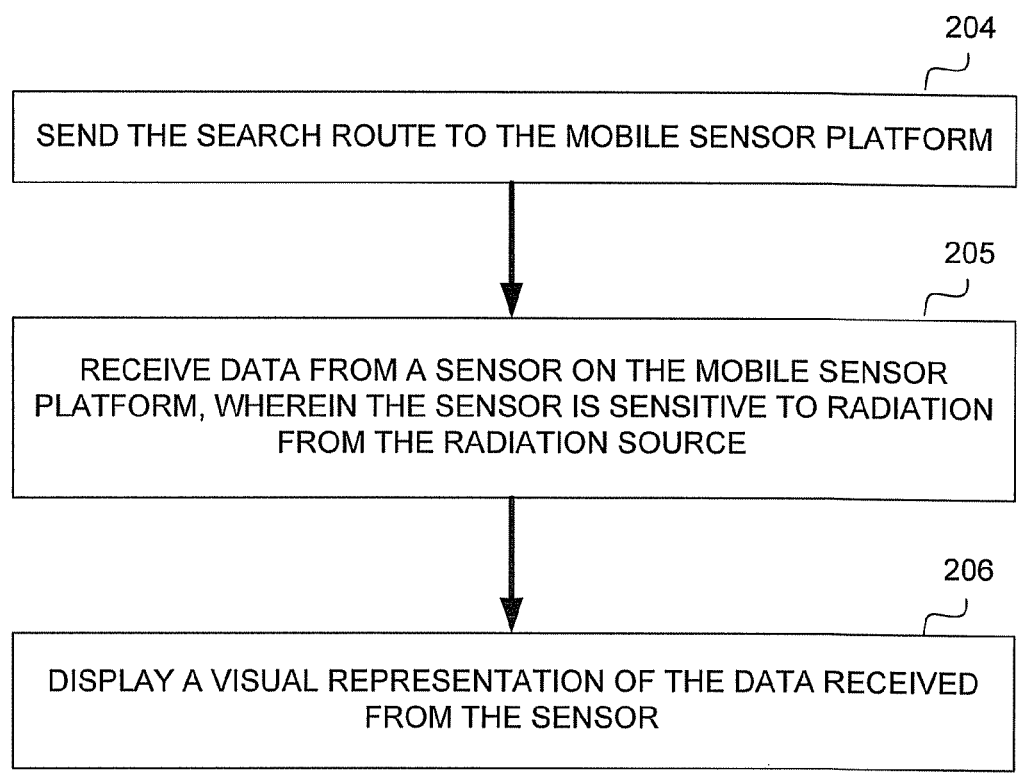
Figure 2C:
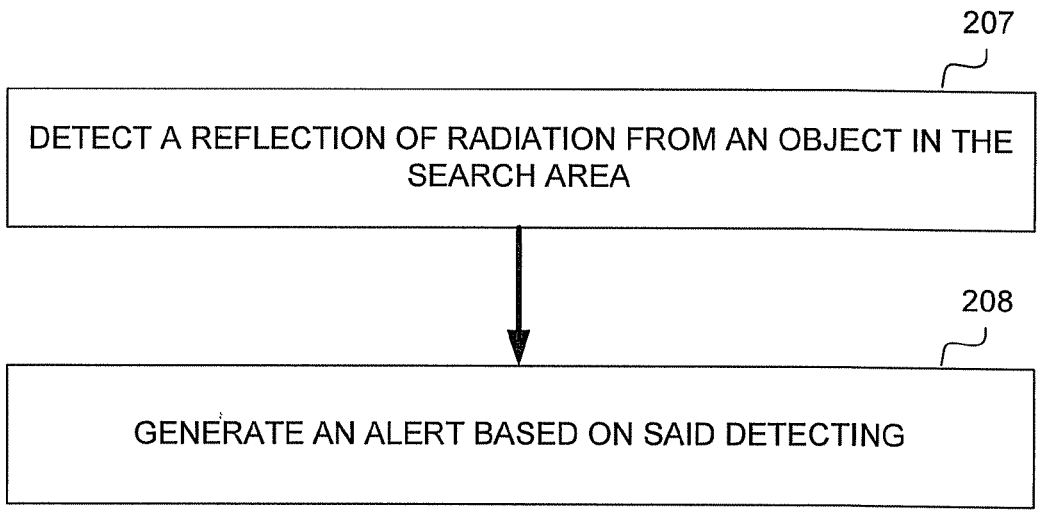
Figure 2D:
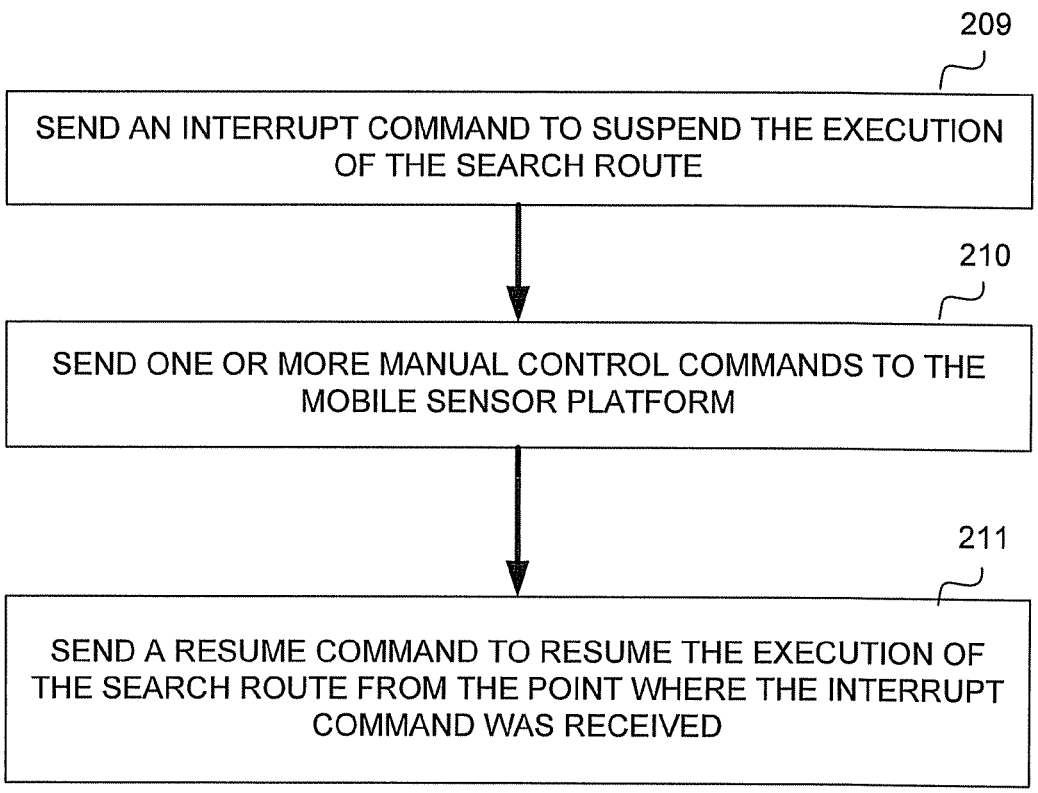

FIG. 1B shows a functional diagram of the control station 100 according to one illustrative embodiment of the disclosed invention. The control station 100 is configured to control the mobile sensor platform 101. The control station 100 includes: (i) operator input devices 104; (ii) a processor 105; (iii) optional databases 106; (iv) a communications module 107; and (iv) a display output 108.

The operator input devices 104 are configured to receive a search area as an input, where the search area corresponds to an area to be searched by the mobile sensor platform 101. The search area input may include one or more electronic maps, aerial photographs, aeronautical charts, or similar inputs that show the search area. The operator input devices 104 may include one or more keyboards, joystick controllers, touchscreens, mouse/pointer devices, disk drives, serial and/or parallel data bus interfaces, and/or other similar input devices known in the art.

The processor 105 is configured to generate at least one search route for detecting reflection, wherein the search route is based on the angle of a radiation source relative to the ground in the search area. To generate the at least one search route for detecting reflection, the processor 105 relies on data from the operator input devices 104 and on data describing the position of the radiation source relative to the ground in the search area. The processor 105 may also rely on data from one or more optional databases 106. The data in the optional databases 106 may include digital terrain data for the search area, aerial photographs of the search area, aeronautical charts of the search area, maps of the search area, or similar information that the control station 100 may use to generate or display the search route. The optional databases 106 may also include data describing the position of the radiation source relative to the ground in the search area. The optional databases 106 may reside locally in storage at the control station 100, or they may reside at a remote location accessible by the control station 100.

The communications module 107 is configured to send data comprising the search route to the mobile sensor platform 101, and to receive data from the sensor 102 mounted on the mobile sensor platform 101. If the control station 100 is configured to use data from one or more remote databases, then the communications module 107 may be configured to send data to and/or receive data from the remote databases. The communications module 107 may include one or more wired or wireless communications interfaces known in the art.

The display output 108 is configured to display a graphical representation of the search route, and to display the data received from the sensor 102 mounted on the mobile sensor platform 101. The display output 108 is preferably a computer screen or similar display device known in the art, and the data received from the sensor 102 is preferably a real-time video signal.

Referring back to FIG. 1A, the mobile sensor platform 101 is an Unmanned Air Vehicle (UAV), but other mobile sensor platforms are envisioned, such as, for example, an Explosive Ordnance Disposal (EOD) robot with a sensor, a rover with a sensor, or any other similar manned or unmanned vehicle or craft on which a sensor for detecting reflection may be mounted or otherwise deployed. The mobile sensor platform 101 has a sensor 102 and a communications unit 103. After receiving a search route from the control station 100, the mobile sensor platform 101 can autonomously execute the search route while sending data from the sensor 102 to the control station 100.

The communications unit 103 is configured to receive data from and to send data to the control station 100. In particular, the mobile sensor platform 101 receives the search route from the control station 100 via the communications unit 103, and while the mobile sensor platform 101 is autonomously executing the search route, the mobile sensor platform 101 sends data from the sensor 102 to the control station 100 via the communications unit 103. The communications unit 103 is preferably a wireless communications unit, but could also be any sort of wired or wireless communications unit that enables data transfer between the mobile sensor platform 101 and the control station 100.

The sensor 102 of the mobile sensor platform 101 is sensitive to radiation from a particular radiation source, and can therefore detect a reflection of the radiation from an object in the search area. The sensor 102 may be an electro-optical sensor if the radiation source emits visible light, an infrared sensor if the radiation source emits infrared radiation, a multispectral sensor or hyper-spectral sensor if the radiation source emits radiation in other regions of the electromagnetic spectrum, or any other similar sensor that is sensitive to radiation from a corresponding radiation source.

In one preferred embodiment, the radiation source is the sun, and the processor 105 in the control station 100 generates at least one search route for detecting reflection based on the angle of the sun relative to the ground in the search area. In this preferred embodiment, the sensor 102 is an electro-optical sensor that is sensitive to the visible light from the sun, and the data from the sensor 102 is a real-time video feed. In this preferred embodiment, the angle of the sun is calculated according to the Solar Position Algorithm (SPA) as defined by U.S. DEPT. OF ENERGY, NATIONAL RENEWABLE ENERGY LABORATORY, TECHNICAL REPORT NREL/TP-560-34302, SOLAR POSITION ALGORITHM FOR SOLAR RADIATION APPLICATIONS (2008), the entirety of which is hereby incorporated by reference. For example, in this preferred embodiment, the sensor 102 may detect the reflection of visible light from the sun from a reflective object in the search area such as, for example, an improvised explosive device (IED) or a trigger wire laid across the ground in the search area, and connecting the IED with a detonator. Although the sensor 102 is used to detect IEDs and IED trigger wires in this preferred embodiment, sensor 102 may be used for detecting any object that reflects radiation from a corresponding radiation source while the mobile sensor platform 101 executes a search route based on the angle of the radiation source relative to the ground in the search area.

In some embodiments, the radiation source may be deployed on the mobile sensor platform in a manner to emit radiation toward the ground in the search area. In other embodiments, the radiation source may be deployed on a platform other than the mobile sensor platform having the sensor, such as, for example, a second mobile sensor platform, a truck, jeep, tank, helicopter, airplane, boat, or any other mobile platform capable of deploying any of the aforementioned radiation sources (e.g., visible light source, infrared radiation source, other radiation sources, etc.) Alternatively, the radiation source may be mounted on a stationary object, such as, for example, a road-side light-post, a building, tower, or other similar structure.

Detecting reflection is possible when the sensor 102 is placed at certain angles relative to a reflective object and the radiation source. Therefore, the search route preferably includes a set of commands to control the (i) position, velocity, and attitude of the mobile sensor platform 101; and (ii) positioning of the sensor 102. With regard to the position, velocity, and attitude of the mobile sensor platform 101, the position corresponds to the coordinates in x-y-z space within the search area, the velocity corresponds to the speed of the mobile sensor platform 101, and the attitude corresponds to the pitch, roll, and heading (or yaw) of the mobile sensor platform 101, where appropriate. The positioning of the sensor 102 corresponds to commands that control the pointing of the sensor for optimal reflection detection. Accordingly, the above-described set of commands is based on (i) the movement capabilities of the mobile sensor platform 101 (e.g., whether the mobile sensor platform 101 is ground-based platform or an air-based platform, the mobile sensor platform's 101 speed, the mobile sensor platform's 101 power and range, etc.), (ii) the resolution and field of view of the sensor 102, and (iii) the search area.

Reflection detection may occur at the mobile sensor platform 101, or alternatively, data from the sensor 102 of the mobile sensor platform 101 may be analyzed at the control station 100 to detect reflection. In the latter embodiment, data from the sensor 102 may be analyzed by the processor 105 at the control station 100, or alternatively, an operator may analyze the data from the sensor 102. In the preferred embodiment, the control station 100 can be configured to detect reflection using standard line and/or edge detection algorithms or similar algorithms that are known in the field of image processing. The control station 100 can be further configured to generate an alert upon the detection of a reflection.

When a reflection is detected, the control station 100 may send an interrupt command to the mobile sensor platform 101 to suspend the execution of the search route. An operator may then use the control station 100 to manually control the movement of the mobile sensor platform 101 and its attached sensor 102 to further investigate the reflection. For example, the operator may use the control station 100 to send commands to the mobile sensor platform 101 to manually control the position, velocity, and attitude of the mobile sensor platform 101, and to control the positioning of the sensor 102. In this manner, the operator is able to conduct further investigation of the area to gain additional information related to the source of the reflection, such as, for example, whether the reflecting object is an IED or a trigger wire associated with an IED. And if the object is an IED trigger wire, the operator can follow the trigger wire to its detonator. After the operator completes the investigation of the reflection, the operator can use the control station 100 to send a resume command to the mobile sensor platform 101, and the mobile sensor platform 101 can then return to the point where the interrupt was received, and resume the autonomous execution of the search route.

FIGS. 2A, 2B, 2C, and 2D depict method 200 according to one illustrative embodiment of the disclosed invention. Method 200 comprises: (1) receiving an input comprising a search area at 201; (2) generating a mobile sensor platform search route for detecting reflection at 202, wherein the search route is based on the angle of a radiation source relative to the ground in the search area; and (3) displaying a graphical representation of the search route at 203. Next, method 200 may additionally comprise: (4) sending the search route to the mobile sensor platform at 204; (5) receiving data from the sensor on the mobile sensor platform at 205, wherein the sensor is sensitive to radiation from the radiation source; and (6) at 206, displaying a visual representation of the data received from the sensor. Method 200 may also further comprise: (7) detecting a reflection of the radiation from an object in the search area at 207; and (8) at 208, generating an alert based on said detecting from step 207. Finally, method 200 may also further comprise: (9) sending an interrupt command to suspend the execution of the search route at 209; (10) sending one or more manual control commands to the mobile sensor platform at 210; and (11) at 211, sending a resume command to resume the execution of the search route from the point where the interrupt command was received.

In a preferred embodiment of method 200, the radiation source is the sun, and the angle of the sun relative to the ground in the search area is calculated according to the SPA as described above. Also in the preferred embodiment of method 200, the search route comprises a plurality of commands to control (i) the position, velocity, and attitude of the mobile sensor platform, and (ii) the positioning of the sensor. In this preferred embodiment, the plurality of commands is based on the movement capabilities of the mobile sensor platform, the resolution and field of view of the sensor, and the search area. Also in this preferred embodiment, the visual representation of the data received from the sensor is a video signal.

Figure 3A:
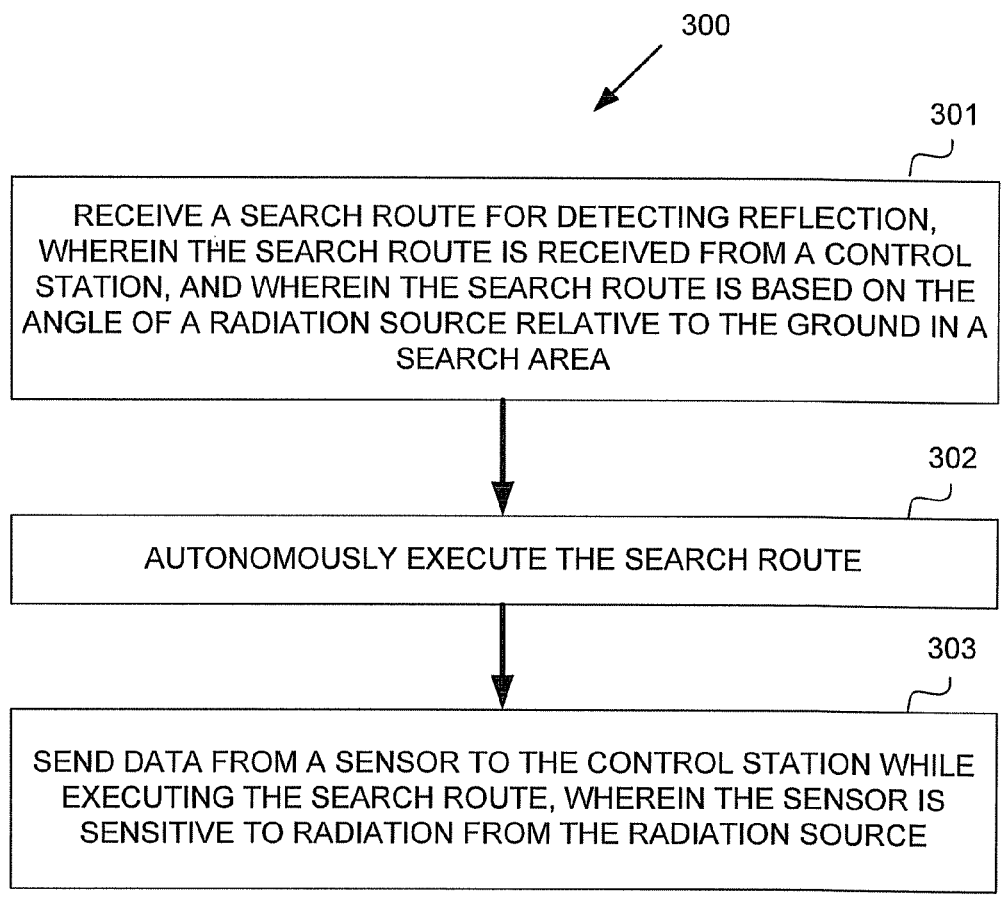

FIGS. 3A, 3B, and 3C depict method 300 according to another illustrative embodiment of the disclosed invention. Method 300 comprises: (1) receiving a search route for detecting reflection at 301, wherein the search route is received from a control station, and wherein the search route is based on the angle of a radiation source relative to the ground in a search area; (2) autonomously executing the search route at 302; and; (3) sending data from a sensor to the control station while executing the search route at 303, wherein the sensor is sensitive to radiation from the radiation source. Method 300 may further comprise: (4) detecting a reflection of the radiation from an object in the search area at 304. Method 300 may still further comprise: (5) receiving an interrupt command to suspend the execution of the search route at 305; (6) receiving one or more manual control commands from the control station at 306; (7) receiving a resume command to resume the execution of the search route at 307; and (8) at 308, resuming execution of the search route from the point where the interrupt command was received.

In a preferred embodiment of method 300, the radiation source is the sun, and the angle of the sun relative to the ground in the search area is calculated according to the SPA, and the sensor is an electro-optical sensor sensitive to visible light from the sun. However, other radiation sources and corresponding sensors are envisioned. For example, the radiation source may be a visible light source, an infrared radiation source, a multi-spectral radiation source, or a hyper-spectral radiation source. Similarly, the sensor may be an electro-optical sensor, an infrared sensor, a multi-spectral sensor, or a hyper-spectral sensor, or any combination of the aforementioned sensors. Also in the preferred embodiment of method 300, the search route comprises a plurality of commands to control (i) the position, velocity, and attitude of the mobile sensor platform, and (ii) the positioning of the sensor. In this preferred embodiment, the plurality of commands is based on the movement capabilities of the mobile sensor platform, the resolution and field of view of the sensor, and the search area. Also in this preferred embodiment, the visual representation of the data received from the sensor is a video signal.

Figure 4A:
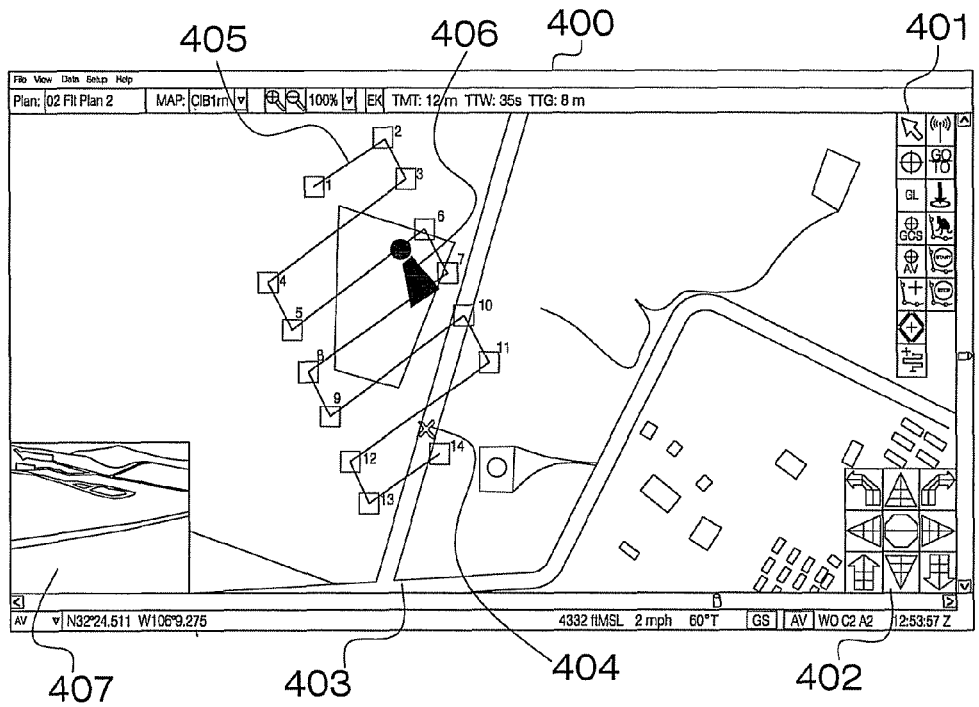
FIGS. 4A and 4B show example screen shots of a control station according to one illustrative embodiment of the disclosed invention.
Figure 4B:
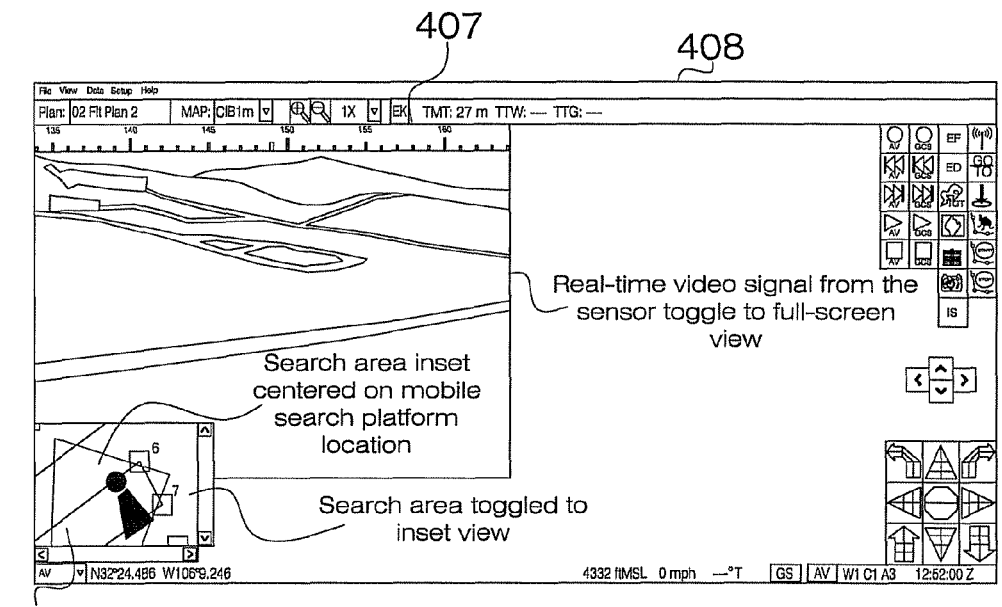

FIGS. 4A and 4B show example screen shots 400 and 408 of a control station according to one embodiment of the disclosed invention. Screen shot 400 in FIG. 4A shows a search route planning toolbar 401 and manual controls 402 for controlling the movement of a mobile sensor platform and its sensor. Screen shot 400 shows an aerial photograph of the search area 403, but a map, an aeronautical chart, or similar image or representation of the search area 203 could also be used. The search area 403 shows a suspected IED location 404, but knowledge of a suspected IED location 403 is not required to plan a search route. Instead, a search route can be planned for searching an area without any specific knowledge of the suspected IED location 404.

The screen shot 400 shows a search route 405 for detecting reflection from objects in the search area 403, including, for example, an IED located at the suspected IED location 404 or an IED trigger wire in the vicinity of the suspected IED location 404. The search route 405 for detecting reflection is based on the angle of a radiation source relative to the ground in the search area 403. In this example embodiment, the radiation source is the sun, and the search route 405 is based on the angle of the sun relative to the ground in the search area 403. The angle of sun relative to the ground in this embodiment is calculated according to the SPA, as described above.

As the mobile sensor platform executes the search route 405, the control station shows the location of the mobile sensor platform and the sensor field of view 406 relative to the search route 405 and any suspected IED location 404. Also, the control station in this embodiment shows a real-time video feed 407 from the sensor on the mobile sensor platform. An operator may toggle between showing the real-time video feed 407 or the search area 403 as the main view or the inset view, respectively, as shown in screen shot 408 in FIG. 4B.

The invention claimed is:

1. A method comprising:
receiving an input comprising a search area to be searched by a mobile sensor platform;
generating a mobile sensor platform search route for the mobile sensor platform for detecting reflection in the search area, wherein the search route is based on an angle of a radiation source relative to a ground in the search area, and wherein the search route comprises commands to control a position and a velocity of the mobile sensor platform; and
displaying a graphical representation of the search route.

2. The method of claim 1, further comprising:
sending the search route to the mobile sensor platform;
receiving data from a sensor on the mobile sensor platform, wherein the sensor is sensitive to radiation from the radiation source, and wherein the sensor generates the data as the mobile sensor platform executes the mobile sensor platform search route; and
displaying a visual representation of the data received from the sensor.

3. The method of claim 2 further comprising:
detecting a reflection of radiation from an object in the search area; and
generating an alert based on said detecting.

4. The method of claim 1 further comprising:
sending an interrupt command to suspend the execution of the search route;
sending one or more manual control commands to the mobile sensor platform; and
sending a resume command to resume the execution of the search route from the point where the interrupt command was received.

5. The method of claim 1 wherein the radiation source is the sun, and wherein the angle of the sun relative to the ground in the search area is calculated according to the Solar Position Algorithm.

6. The method of claim 1, wherein the search route further comprises commands to control the positioning of the sensor.

7. The method of claim 1, wherein generating the mobile sensor platform search route for detecting reflection comprises generating the mobile sensor platform search route for detecting reflection of the radiation generated by the radiation source from a trigger wire of an explosive device.

8. The method of claim 1, wherein generating the mobile sensor platform search route for detecting reflection comprises generating the mobile sensor platform search route for detecting reflection of visible light.

9. The method of claim 1, wherein the commands are based on the movement capabilities of the mobile sensor platform, the resolution of the sensor, the field of view of the sensor, and the search area.

10. The method of claim 1, wherein the search route further comprises commands to control the attitude of the mobile sensor platform.

11. A system comprising:
a control station comprising: (i) input means for receiving a search area as an input; (ii) a processor configured to generate at least one search route for detecting reflection in the search area, wherein the search route is based on an angle of a radiation source relative to a ground in the search area, and wherein the search route comprises commands to control a position and a velocity of the mobile sensor platform; (iii) a communication means for sending data comprising the search route to a mobile sensor platform, and for receiving a real-time video signal from a sensor mounted on the mobile sensor platform, wherein the sensor is sensitive to radiation from the radiation source ; and (iv) display means for displaying a graphical representation of the search route and for displaying the real-time video signal received from the sensor mounted on the mobile sensor platform.

12. The system of claim 11, further comprising:

the mobile sensor platform comprising: (i) a sensor for detecting reflection, wherein the sensor is sensitive to radiation from the radiation source; (ii) communication means for receiving data comprising the search route from the control station and for sending a real-time video signal from the sensor to the control station as the mobile sensor platform executes the search route; and (iii) control means for autonomously executing the search route.

13. The system of claim 12, wherein the sensor is one of an electro-optical sensor, an infrared sensor, a multi-spectral sensor, or a hyper-spectral sensor.

14. The system of claim 12 wherein the sensor detects a reflection of radiation from an object in the search area, and wherein the control station generates an alert based on said detecting.

15. The system of claim 11, wherein the search route further comprises commands to control the positioning of the sensor.

16. The system of claim 11 wherein the data further comprises:

an interrupt command to suspend the execution of the search route;

one or more manual control commands; and a resume command to resume the execution of the search route from the point where the interrupt command was received.

17. The system of claim 11, wherein the processor is configured to generate the mobile sensor platform search route for detecting reflection of visible light.

18. The system of claim 11, wherein the sensor comprises an electro-optical sensor.

19. The system of claim 11, wherein the commands are based on the movement capabilities of the mobile sensor platform, the resolution of the sensor, the field of view of the sensor, and the search area.

20. The system of claim 11, wherein the search route further comprises commands to control the attitude of the mobile sensor platform.

* * * * *